United States Patent [19]

Lincoln

[11] 4,326,695
[45] Apr. 27, 1982

[54] POSITIVE OPENING DEVICE FOR PINCH VALVE SLEEVES

[76] Inventor: Edgar B. Lincoln, 626-B Country Club Pkwy., Mount Laurel, N.J. 08054

[21] Appl. No.: 225,413

[22] Filed: Jan. 15, 1981

[51] Int. Cl.³ ............................................. F16L 55/14
[52] U.S. Cl. ......................................... 251/7; 251/8
[58] Field of Search ....................................... 251/7, 8

[56] References Cited

U.S. PATENT DOCUMENTS

| | | | |
|---|---|---|---|
| 1,931,320 | 10/1933 | Haushalter | 251/8 |
| 3,268,201 | 8/1966 | Little | 251/8 |
| 3,811,649 | 5/1974 | Press et al. | 251/8 |

FOREIGN PATENT DOCUMENTS

| | | | |
|---|---|---|---|
| 503291 | 5/1929 | Fed. Rep. of Germany | 251/8 |
| 1086956 | 8/1960 | Fed. Rep. of Germany | 251/7 |
| 6501288 | 8/1965 | Netherlands | 251/8 |

*Primary Examiner*—H. Jay Spiegel
*Attorney, Agent, or Firm*—Eugene Chovanes; Edward Lovett Jackson

[57] ABSTRACT

A positive opening device for pinch type valves having an elastomeric body consisting of a generally cylindrical sleeve portion forming a material flow passage, with flange portions at the ends for attachment into material flow lines. Under low pressure conditions of operation, or where the sleeve portion has taken a set, being deformed or in partially closed position, it is desireable to improve the function of restoring the sleeve to a full open condition, whether of a full round type or of a pre-pinched type. The sleeve consists of an elastomeric inner layer surrounded by multiple plies of fabric reinforcement, embedded in elastomeric material in the valve body finalized form, and the fabric reinforcement extends through the sleeve and into the flanged ends. End reinforcements extending partially through the sleeve and up into the flanges are added to the body structure. Means to restore the open condition, consisting of opening flaps, are added as an integral part of the reinforcement, being formed by extension of the fabric of the end reinforcement. Subsequent reinforcement plies secure the opening assist flaps in the fabric structure of the sleeve. Individual centrally directed and opposed flaps thus formed have enhanced support and strength, being part of reinforcement which completely encircles the sleeve and extends into the flanges. Lifting effort is extended over a substantial length of the sleeve with a decreased lifting stress on the reinforcements.

7 Claims, 12 Drawing Figures

POSITIVE OPENING DEVICE FOR PINCH VALVE SLEEVES

TECHNICAL FIELD

The present invention relates generally to pinch type valves which include elastomeric pinch valve sleeves or bodies, and which utilize a principle of squeezing or pinching of the elastomer tube or valve sleeve to control flow of material through the valve. The valve is normally installed in a material flow conduit or line. Pinch valves of this type under some circumstances, such as low operating pressure conditions, require means to facilitate achieving a full opening of the sleeve, subsequent to closure thereof, where the sleeve has been deformed, or placed in a partially closed position, and has taken a set. The present invention is primarily directed to apparatus and means to achieve a full opening of the pinch valve sleeve in a positive manner, and thereby obviate an operational problem in use of pinch valves.

BACKGROUND OF THE INVENTION

Pinch valves of a type which use the principle of squeezing or pinching an elastomer tube or valve sleeve to control flow of material therethrough, in a pipeline or conduit, are available in numerous types and configurations to suit a wide range of applications. They are available in manual, and/or automated forms using pneumatic, hydraulic or electric operators. The valves are available in full round configurations, or in a form of pre-pinched valves. The former, in the open position, have the same inside diameter and capacity as a pipeline in which attached. They offer a straight unobstructed flow path with maximum capacity and minimum pressure drop. Such configurations or constructions are required in some applications where working conditions such as velocity, particle size, or cleaning of the line are determining factors.

Pre-pinched valves which have an initial compression or pinching of the valve sleeve, of for example fifty percent in one direction, serve to reduce a valve closing apparatus stroke requirement by approximately the same amount, i.e. fifty percent. In this type of valve, due to the elastic nature of the valve sleeve, an elliptical port is formed which functionally has approximately ninety-five percent of the capacity of a full round valve.

Overall valve constructions can include open construction valves having an external closing or pinching mechanism mounted around the valve sleeve, or totally enclosed valves which provide support and protection for both the valve sleeve and mechanism. Each of these types of valves are suitable for use under particular circumstances of use.

Pinch valves normally display excellent flow control characteristics, primarily due to the streamlined interior of the valves which produces a minimum change in the flow path at the throttling position, and a subsequent lack of turbulence. Each overall type of pinch valve construction and form, i.e. full open or pre-pinched, serve in different areas of use with respective optimum advantages.

Generally speaking, the elastomer tube or valve sleeve is the primary element of importance in a pinch valve. It consists of an elastomer inner layer surrounded by multiple plies of fabric reinforcement. Arrangement of the fabric plies can be altered, if necessary, to suit specific application requirements. Many different elastomers are available, as are fabrics of different materials and specific constructions.

Pinch valve sleeves are normally fully compression molded to maintain construction uniformity and consistency in performance. This full compression molding integrates the fabric reinforcing plies within the elastomer material to integrate the entire overall structure.

It has been found in practice however that pinch valves made or constructed from elastomeric valve bodies as above described, frequently have a common problem in different use environments. This problem is failure of the elastomeric valve body to be restored to a fully open condition after being closed for an extended length of time. A "set" will take place in the valve body material or valve body, subsequent to a relatively lengthy closure of the sleeve by being deformed or placed in a partially or fully closed position. Under low pressure flow conditions of material passing through the valve, as compared to high pressure flow, the fluid pressure in the valve will not serve to fully open the valve body. Under some circumstances a negative pressure exists, and this increases the problems of restoration to a fully open condition.

Different attempts have been made previously to develop positive opening body sleeve conditions. Some structures have employed metal lugs in the valve body attached to a valve actuating element. In use however, such inflexible lugs tend to tear out of the relatively soft elastomeric valve body.

Another previous construction attempting to develop a positive opening body has used integrally molded flexible tabs attached to the valve actuating elements, and which serve to, at least in part, permit a positive opening of the valve body. Such a known construction is disclosed in prior U.S. Pat. No. 3,268,201, issued Aug. 23, 1966. While the construction of this patent constituted an advance in the art, there are drawbacks inherent in the structure. The tabs of this prior patent are integrally molded into the valve body, with the tab assembly including a flat tab element, the ends of which are upwardly lifted to form the tabs. This tab element is superposed axially onn the body over a so-called "belly band" which is disposed perpendicularly to the tab element. The belly band extends circumferentially partially around the valve body. The belly band constitutes an activating strap portion for applying an opening force to the sleeve, and covers only a relatively narrow length portion of the sleeve. This results in a restricted area or length of the sleeve having the opening force applied thereto.

Various other attempts have been made to overcome this long existing problem but none have been completely satisfactory.

SUMMARY OF THE INVENTION

The present invention accordingly is broadly directed to pinch type valves consisting of an elastomeric body sleeve, forming a material flow passage therethrough, and having flange portions at the ends for attachment into material flow lines. The invention constitutes improved means for insuring restoration of, and/or implementing, full opening of the sleeve under operating conditions.

It is a principle object of the present invention to provide apparatus or means incorporated in elastomeric sleeves in pinch valves which are operable to positively open the sleeve, or to restore the sleeve to an open position subsequent to conditions of use which have established a deformed or partially closed set in the material, and the sleeve configuration formed thereby.

A further object of the invention is to provide opening assist flaps in fabric portions of the structure, such as reinforcement plies incorporated in elastomer material comprising the valve sleeve, to facilitate a substantially full open condition of the sleeve. Due to this arrangement, the lifting or opening effort is extended over a substantial sleeve length, resulting in a decreased lifting stress on the sleeve reinforcements.

An additional object of the invention is to provide, in fabric reinforced pinch valve elastomeric sleeve bodies, positive opening assist means consisting of opening flaps or tabs which are added as an integral part of the normal reinforcement in such a sleeve. The opening assist means are formed by extension of the fabric of the sleeve and of end flange reinforcements. Individual centrally directed and opposed flaps are formed which have enhanced support and strength, being part of a reinforcement which completely encircles the valve sleeve body and extends into the flanges.

A still further object of the invention is to provide a positive opening device for pinch valve sleeves wherein the opening effect or force, extending over a relatively substantial length of the sleeve body, thereby results in a more fully extensive and complete opening of the sleeve.

In essence, accordingly, the objects and advantages of the present invention, especially as compared with prior art attempts, provides in an elastomeric valve body sleeve, opening flaps which are an integral part of the fabric structure of the sleeve; the flaps have greater support and strength, being part of the reinforcements which completely encircle the sleeve and extend into end flanges; the sleeve opening lifting effect or effort is extended over a greater area of the sleeve; the flaps and reinforcements incorporated therein, and in the sleeve 60, do not affect the pinch or closure area; individual flaps as utilized reduce the lifting stress on the reinforcements, directing it toward each end of the valve sleeve body.

Still other objects and advantages of the present invention will become readily apparent to those skilled in this art from the following detailed description, wherein there is shown and described only a preferred embodiment of the invention, simply by way of illustration of a best mode contemplated currently for carrying out the invention. As will be realized, the invention is capable of other and specific embodiments, and its several details are capable of modification in various, obvious respects, all without departing from the invention. Accordingly, the drawings and description are to be regarded merely as illustrative in nature, and not as restrictive.

BRIEF DESCRIPTION OF THE DRAWINGS

The accompanying drawings illustrate a preferred embodiment of the invention and, when taken together with the description, serve to explain the principles of the invention.

DETAILED DESCRIPTION OF THE PREFERRED EMBODIMENT

Figure 1:
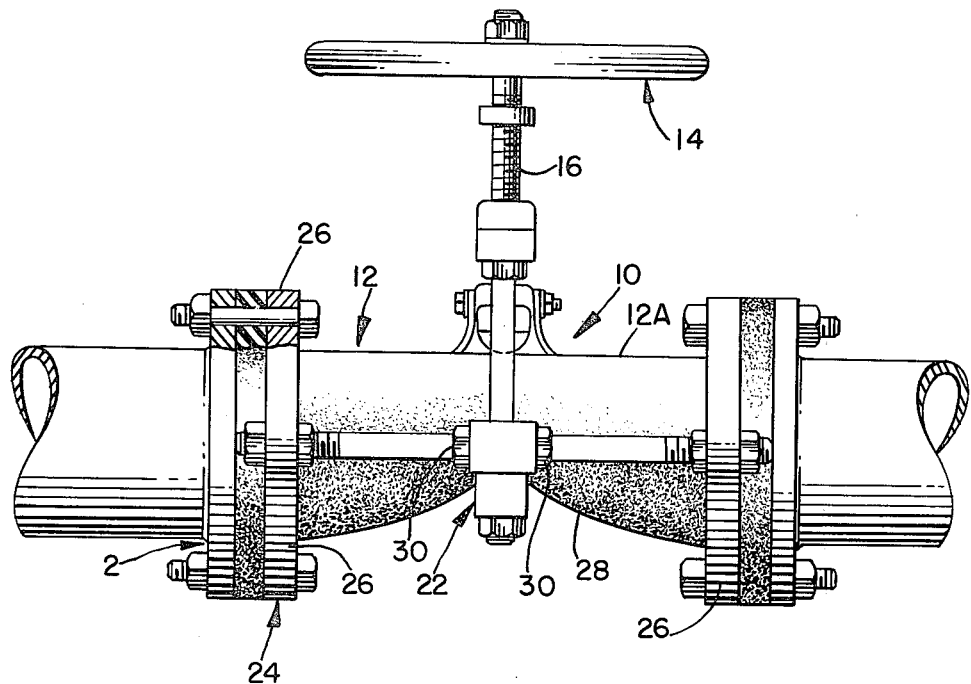
FIG. 1 is a side elevational view of a pinch type valve in accordance with the invention and including the operating and support apparatus in which incorporated.

Referring now in detail to the drawings, FIG. 1 shows a pinch valve type generally designated 10, known in the trade as an open type construction, and wherein the valve sleeve or valve body 12 is of a pre-pinched configuration. In the apparatus shown, manual operating means are used, indicated by a hand wheel 14 having a screw-threaded shaft 16 operatively engaged with a yoke member 18. The outer ends of yoke 18 have downwardly extending legs 20, attached to a flat lower support member 22 of a casing, generally designated 24, for mounting the overall valve and valve pinch apparatus. Casing 24 includes end members or flanges 26 operatively interengaged by bolt and nut combinations 28. The inner ends of the bolts operatively engage the lower support member 22, by nuts 30 on opposite sides thereof, this structure being known.

Figure 2:
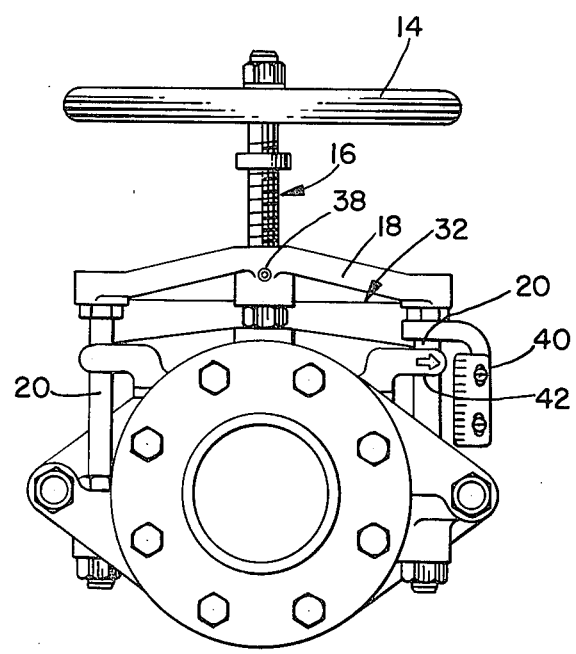
FIG. 2 is an end elevational view of the apparatus of FIG. 1.
Figure 5:
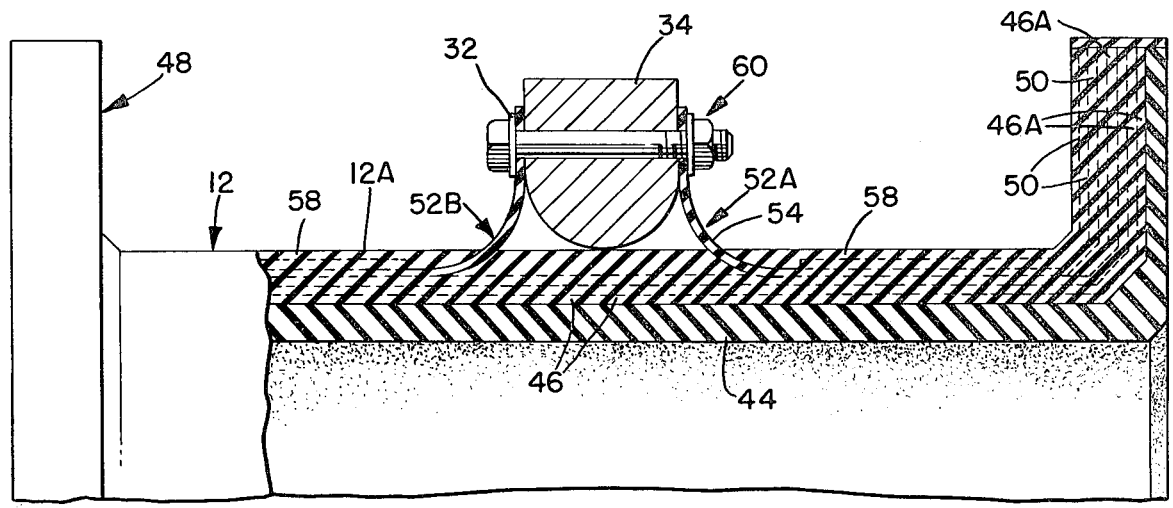
FIG. 5 is a fragmentary schematic view taken essentially on line 5—5 of FIG. 4, parts being broken away, and disclosing the valve opening flaps operatively attached to a valve operating upper pinch bar, the remaining valve operating structure being omitted.

The means for compressing or pinching the sleeve 12 from the open condition, shown in FIG. 1, to a closed position wherein the interior sleeve surfaces at the top and bottom are pinched or compressed into closing contact one with another, includes a closing bar generally designated 32, with an actual closing bar member 34 in contacting engagement with upper surface 12A of sleeve 12, as shown in greater detail in FIG. 5. The yoke 18 is fixedly positioned with respect to the casing by means of the extended legs 20 attached at opposite ends of yoke 18 as shown in FIG. 2. A set screw, or the like, 38 operatively interengages yoke 18 and the threads of screw threaded shaft 16. A scale 40 is attached to one of the extended legs at 20 (FIG. 2) and coacts with a pointer arm 42 to operatively visually indicate the actual position of the closing member or bar 34, and therefore indicate visually the amount or degree of closure of the sleeve 12. The lower end of shaft 16 is operationally rotatably engaged with closing bar 32 and, by coaction of set screw 38 engaging with the threads on threaded shaft 16, upon rotation of hand wheel 14 will move the closing bar member 34 on closing bar 32 downwardly. This compresses or urges the upper half of the sleeve downward so that its inner surface engages with the inner surface of the lower half. This is the closed position of the valve, as known in the art.

Omitting for the time being a comparison of the operations of the old and new types, the construction of the tube or sleeve body of the invention is shown in FIG. 5. The sleeve 12 is of generally cylindrical configuration, including an inner elastomer tube layer 44. The material of the elastomer is of any desired appropriate materials known in the art, and useable to deal with applications involving different conditions of abrasion, chemical and corrosion. Typical sleeve materials are well known in the art. In a known and usual manner, the elastomer inner layer 44 is surrounded by multiple plies of fabric reinforcement shown at 46 and which extend through the sleeve body and up into the flanged end portion 48 of the sleeve. These extensions of the fabric plies are indicated at 46A in the right portion of FIG. 5. These end extensions of the fabric plies terminate in the flanged portions at the ends of the sleeve.

Figure 6:
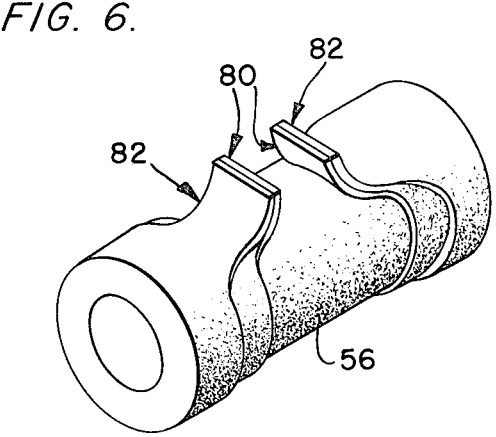
FIG. 6 is a perspective view of a modified form of the invention.
Figure 7:
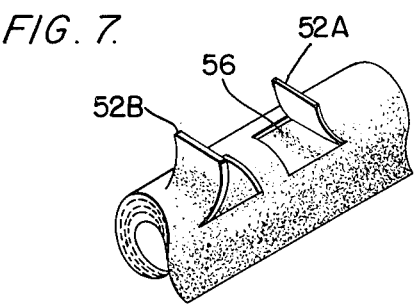
FIG. 7 is a fragmentary perspective view of a sleeve wherein the opening flaps are shown as molded to a sleeve construction.

End reinforcements 50, which extend partially through the sleeve and up into the flanges, are then added. At this point in construction of the sleeve of the invention, the opening flaps 52A, 52B are added as an integral part of the reinforcement. The flaps 52A, 52B are formed by an extension of the fabric of the end reinforcement, that portion being shown in cross-section hatching at 54. In essence, this consists of at least two of the fabric plies and elastomeric material embodying or incorporating the same. It will be seen from FIG. 7 that the tabs or flaps 52A, 52B are molded as an integral part of the reinforcement which, in effect, as shown in FIG. 6, is a surrounding sleeve formed over the sleeve body consisting of the fabric plies and elastomer material with which integrated. The pre-formed inner sleeve portion of FIG. 7, and others, is generally designated 56. The flap-forming reinforcement and extension of the fabric at the ends is mounted thereover in the construction.

Subsequent plies of reinforcement 58 secure the flaps in the fabric structure of the sleeve. This method results in two individual flaps 52A, 52B being formed, and which extend toward the center of the sleeve as shown in the drawings, noting FIG. 5 in particular. The overall construction is a single molded entity of the elastomeric and fabric portions. The ends of the flaps are joined to closing bar member 34 by a bolt and nut combination 60. As will be obvious, actuation of the hand wheel 14 will serve to raise or lower closing bar member 34. This serves to compress the upper half or section of sleeve 12 toward the lower section to a valve closed condition and, upon raising or elevation of closing bar member 34, serves to open the sleeve by coaction with the flaps or tabs 52A, 52B, and upwardly positively move the upper half of the sleeve to valve open condition.

Figure 3:
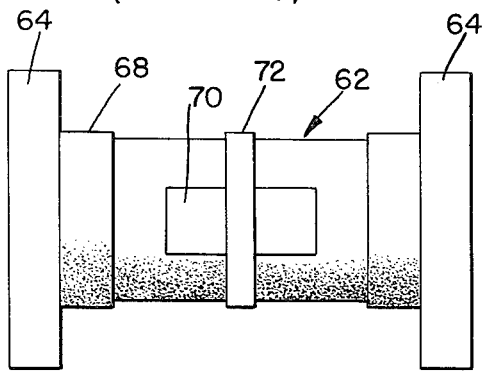
FIG. 3 is a schematic depication, in plan view, of a prior art type of valve opening assist construction.
Figure 4:
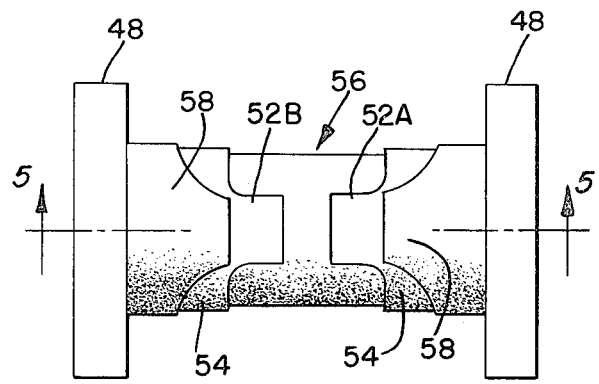
FIG. 4 is a plan view of a positive opening device for pinch valve sleeves in accordance with the present invention.
Figure 3A:
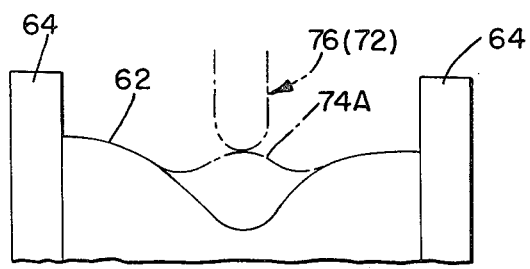
FIG. 3A is a fragmentary schematic elevational view of the prior art construction of FIG. 3, disclosing the overall opening result attained with the opening assist means of this prior art type.
Figure 4A:
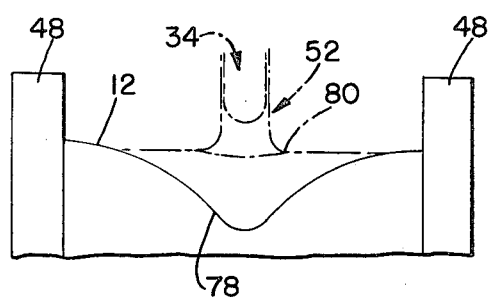
FIG. 4A is a fragmentary, schematic, side elevational view of the structure of FIG. 4, disclosing the substantial sleeve opening effect resulting from the structure of the invention.
Figure 3B:
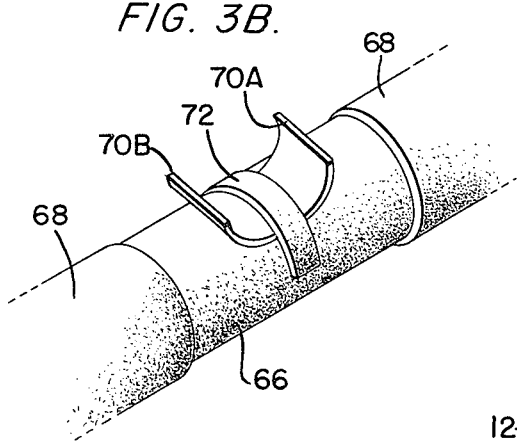
FIG. 3B is a perspective view of the opening device of the prior art type of FIG. 3 on a reduced scale, and as functionally applied to a sleeve.
Figure 4B:
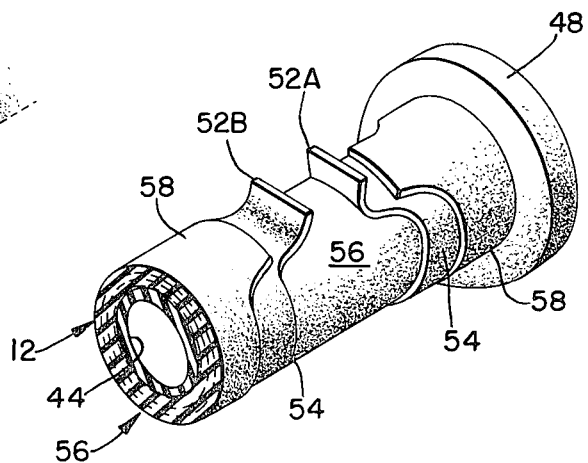
FIG. 4B is a reduced, perspective view, of the apparatus of the present invention, a part being broken away for clarity, and disclosing positive opening flaps as integrated with the sleeve in accordance with the invention.

The differences in construction and function of the present invention, as compared with the prior art, is more readily understandable from a study of FIGS. 3, 3A and 3B taken with FIGS. 4, 4A and 4B. Referring initially to FIG. 3 which depicts the prior art, the sleeve 62 has ends or flanges 64. The sleeve 62 incorporates body plies, generally designated 66, and end reinforcements 68. A flap or tab 70, similar to the flat tab element 38 shown in FIG. 5 of prior U.S. Pat. No. 3,268,201, is incorporated in the sleeve structure, and around which there is placed a strap 72. The flaps or tabs are shown in a raised, operative position in the prior art structure at 70A, 70B. This facilitates comparison with the tabs 52A, 52B of the present invention, referring to FIG. 5. The opening effect of this prior art structure is schematically depicted in FIG. 3A. Here the lowermost or depressed position of the upper half of the sleeve is shown at full lines at 74, as effected by a downward movement of a closing bar member, shown in broken lines at 76. When the closing bar is elevated so as to open the sleeve, the heretofore depressed portion 74 is raised to a position indicated by broken lines at 74A. It will be apparent that only a partial opening of the sleeve takes place.

Now, comparing this structure and function with that of the present invention, reference is made to FIGS. 4, 4A and 4B. The sleeve as integrated, including the fabric plies and elastomer, is shown at 56 with the end flanges at 48. The flaps or tabs 52A, 52B are here shown as being the inner ends of a long type end reinforcement, as designated and shown at 54 in FIG. 5. A short top reinforcement 58 is shown in this view, as also in FIG. 5. The operational position of the tabs 52A, 52B is disclosed in FIG. 4B. Referring to FIG. 4A, the compressed or depressed position of the upper half of the sleeve 12, designated by full lines 78, with the flaps 52 and closing bar member 34 being schematically shown in broken lines. When the closing bar member has been raised to the elevated position for opening of the valve body sleeve 12, the position of the upper half of the sleeve is as shown in broken lines at 80. This substantial opening effect of the design of the present invention, as compared with that of the prior art shown in FIG. 3A, is the direct result of the lifting effort being provided over a greater area of the sleeve, approximately sixty percent of the sleeve length. It is again noted that the flaps of the present invention have greater support and strength, being part of the reinforcements 54, 58 which completely encircle the sleeve, and extend into the flanges. The opening flaps 52A, 52B are formed as an integral part of the fabric structure of the sleeves, and the portions of the reinforcement plies extending into the ends, or end flanges 48. The flaps and reinforcements as shown and described do not affect the closure area or pinch point of the valve. It is also to be noted that the individual flaps act to reduce the lifting stress on the reinforcements, directing it toward each end of the sleeve.

While the embodiments of the invention heretofore described have referred primarily to single ply or constituent flaps, it is to be noted that multiple ply flaps can be fabricated by utilizing extensions of successive layers of reinforcement. Such a construction is broadly shown in FIG. 5, wherein the reinforcement member 54 in effect includes the outer extended ends of two layers of fabric reinforcement plies, as indicated by heavy, solid crosssection lines.

This multi-ply formation of the flaps is perhaps more clearly shown in FIG. 6 of the drawings. The inner integrated sleeve 56 has a flap and long reinforcement, generally designated 80, in conjunction with a flap and short reinforcement, generally designated 82. The structure otherwise is similar to that shown in the other figures of the drawings.

Figure 8:
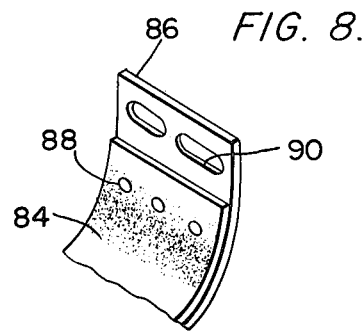
FIG. 8 is a fragmentary view of a further modification of connecting end means for the tabs of the invention.

FIG. 8 discloses an alternate method for flap attachment. In this embodiment the fabric flap 84 has a stainless steel plate 86, constituting a flap extension, attached by means of rivets 88. Elongated slots 90 are formed in the plate 86 and serve for attachment to closing bar member 34 by bolt/nut combination 60.

The structure, function and advantages of the present invention will be readily understandable from the foregoing description of preferred embodiments thereof when taken together with the drawings.

Many other possible variations in specifics of components or details of the invention will be apparent to those skilled in the art. While in the present disclosure, there are shown and described preferred embodiments of the invention, it is to be understood that the invention is capable of changes or modifications without departing from the spirit and the scope of the inventive concept as expressed herein.

I claim:

1. A positive opening device for a pinch valve sleeve, said sleeve including an elastomer inner layer, multiple plies of fabric reinforcement extending through said sleeve, end flanged portions on said sleeve, at least some of said fabric reinforcement plies extending through said sleeve and extending up into said end flanges and being added externally of said initial reinforcement plies, sleeve opening flaps constituting integral parts of said at least some fabric reinforcement plies and formed as extensions of the fabric thereof, additional plies of reinforcement fabric overlying said flap forming portions and securing said flaps in the fabric structure of the sleeve, said flaps including two individual flaps positioned proximate to and extending toward the center of said sleeve, and being integral parts of the fabric reinforcement structure of the sleeve.

2. A positive opening device for a pinch valve sleeve as defined in claim 1, end reinforcements completely encircling said sleeve and extending into said flange portions, said flaps constituting portions of said end reinforcements encircling said sleeve.

3. A positive opening device for a pinch valve sleeve as defined in claim 2, the flaps constituting fabric reinforcing extensions of said end reinforcement extending over approximately a minimum of 50 to 60 percent of said sleeve length, and adapted upon application of an opening lifting movement thereof in a pinch valve construction to create a lifting effort over a substantial length of said sleeve.

4. A positive opening device for a pinch valve sleeve as defined in claim 3, said individual flaps consisting of a portion of extended reinforcements of said sleeve, thereby reducing lifting stress on segments of the reinforcements and directing lifting stresses toward each end of said sleeve.

5. A positive opening device for a pinch valve sleeve including a sleeve body, a support casing for said sleeve, said sleeve having end flanges adapted for attachment to a material flow line and to said casing for operative support thereby, means operatively mounted to said casing adapted for engagement with an upper side of the exterior of said sleeve and operable to compress the upper side of said sleeve toward the lower side thereof to thereby close a flow passage through said sleeve, said compressing means being reversable to an upper sleeve opening position, said sleeve including reinforcing fabric plies extending therethrough and into said flanges, opening assist flaps integrated in said sleeve and including extensions of said reinforcing fabric plies, said flaps having opposed, coactable, free inwardly directed ends, and being attached to said sleeve compressing means, said opening assist flaps, upon upward movement of said compressing means, operating to positively upwardly move the previously compressed portion to open the flow passage by spatial movement of the upper sleeve side from the lower sleeve side, said sleeve being formed of an integrated elastomer material and a plurality of coextensive reinforcement fabric plies embedded therein, the fabric plies, extending through the sleeve body and up into end connection flanges of the sleeve; said flaps being formed of portions of said reinforcement fabric plies and integrated with the overall valve body sleeve as formed, additional reinforcing plies applied over said flap forming portions and constituting a complete sleeve surrounding reinforcing member, all components being moldably integrated into a single integral and composite sleeve body.

6. A positive opening device for pinch valves having an elastomeric pinch type valve body comprising, a generally cylindrical sleeve, flange portions at the ends of said sleeve for attachment of said sleeve to a material flow line, an elastomer inner layer in said sleeve, multiple plies of fabric reinforcement embedded in elastomeric material surrounding said elastomer inner layer in finalized form of said valve body, at least some of said reinforcement plies extending through said sleeve and into said flanges portions, end reinforcement forming fabric plies extending partially through the sleeve and up into flanges and added to said sleeve structure, individual, free inner end, sleeve opening assist flaps constituted as integral parts of said sleeve reinforcements and extensions of the fabric of said end reinforcement plies, additional plies of reinforcement overlying the opening assist flap forming reinforcement plies and securing said opening assist flaps in the fabric structure of said sleeve, said individual opening assist flaps being centrally and oppositely disposed and portions of reinforcement completely encircling said sleeve and extending into said flanges, whereby lifting effort is extended over a substantial length of the sleeve and with a decreased lifting stress on the reinforcements.

7. In a pinch type valve having an elastomeric body consisting of a generally cylindrical sleeve portion forming a material flow passage, with flange portions at the ends for attachment into material flow lines, and wherein under low pressure conditions of operation, or where the sleeve portion is subjected to being set by being deformed or partially closed, and wherein it is desirable to improve restoring the sleeve to a full open condition subsequent to closure, whether of a full round type or of a pre-pinched type, with the sleeve consisting of an elastomeric inner layer surrounded by multiple plies of fabric reinforcement embedded in the elastomeric material in a finalized body form, and with fabric reinforcement extending through the sleeve and into the flanged ends, the improvement comprising: end fabric reinforcements extending partially through said sleeve and into said flanges, and added to the sleeve structure of said body, means operable to restore the sleeve open condition, said means including opening assist flaps formed as an integral part of the reinforcements, and as an extension of the fabric of said end reinforcements, additional reinforcement plies overlying and securing said opening assist flaps in the fabric structure of said sleeve, said opening assist flaps being individual, centrally directed and opposed flaps having enhanced support and strength, and being part of reinforcements completely encircling said sleeve and extending into said flanges, lifting effort of said extended opening assist flaps being extended over a substantial length of the sleeve with a resultant decreased lifting stress on said reinforcements.

* * * * *